United States Patent
Guski et al.

(10) Patent No.: US 6,711,679 B1
(45) Date of Patent: Mar. 23, 2004

(54) PUBLIC KEY INFRASTRUCTURE DELEGATION

(75) Inventors: Richard H. Guski, Red Hook, NY (US); Timothy J. Hahn, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,871

(22) Filed: Mar. 31, 1999

(51) Int. Cl.$^7$ ................................................. H04L 9/00
(52) U.S. Cl. ....................................... 713/156; 713/157
(58) Field of Search ................................. 713/156–160

(56) References Cited

U.S. PATENT DOCUMENTS

| | | |
|---|---|---|
| 4,868,877 A | 9/1989 | Fischer |
| 5,005,200 A | 4/1991 | Fischer |
| 5,214,702 A | 5/1993 | Fischer |
| 5,224,163 A | 6/1993 | Gasser et al. |
| 5,615,268 A | 3/1997 | Bisbee et al. |
| 5,649,099 A * | 7/1997 | Theimer et al. ............ 713/201 |
| 5,745,574 A | 4/1998 | Muftic |
| 5,748,738 A | 5/1998 | Bisbee et al. |
| 5,850,442 A | 12/1998 | Muftic |
| 6,330,677 B1 * | 12/2001 | Madoukh .................... 713/200 |
| 2002/0069174 A1 * | 6/2002 | Fox et al. ..................... 705/52 |

OTHER PUBLICATIONS

Szabo, Nick, "Delegation and Agreement Based Certification Policy", http://szabo.best.vwh.net/trust.html, 1997, entire document.*

Hu, Yuh–Jong, "Agent–Oriented Public Key Infrastructure for Multi–Agent E–Service", Emerging Network Technology Lab. Dept. of Computer Science, National Chengchi University, Taipei, Taiwan 116, 1999, entire document.*

Microsoft Corp.,IMAGEHLP Functions for Embedding Digital Signatures in PE–Format Executables (draft),Microsoft Corp, Feb. 1996,entire document.*

Branchaud, Marc, A Survey of Public–Key Infrastructures, Department of Computer Science, McGill University, Montreal, Canada, Mar. 1997, entire document, particularly chapters 3 and 4.*

"A DCE Directory/Security Structure for the Intranet/Enterprise", IBM Corporation, Research Disclosure, p. 453, Apr. 1998.

"DFS As An Internet File System", IBM Corporation, Research Disclosure, pp. 625–626, May 1998.

"Extending Secure Sockets Layer for Key Recovery", IBM Technical Disclosure Bulletin, vol. 41, No. 01, pp. 169–170, Jan. 1988.

\* cited by examiner

*Primary Examiner*—Norman M. Wright
*Assistant Examiner*—Ronald Baum
(74) *Attorney, Agent, or Firm*—Schmeiser, Olsen & Watts; Arthur J. Samodovitz

(57) ABSTRACT

An approach for allowing a server to act on behalf of an original requestor (originator) which includes an approach for indicating the chain of servers through which the original request came has been defined. This provides a mechanism for a server to act as a "delegate" for a request made by an originator. This approach uses PKI constructs and relies upon public-private key digital signatures for verifying the validity if the "delegation" information. The approach described here allows the originator some control over the extent to which its identity can be used on its behalf by servers that it contacts and servers that are contacted on its behalf. The entire "delegation chain" is contained within the construct, allowing examination of the "path" that a request has taken in getting to a server from which service was requested.

25 Claims, 6 Drawing Sheets

PUBLIC KEY INFRASTRUCTURE DELEGATION

BACKGROUND OF THE INVENTION

1. Technical Field

The present invention relates to a computer networking system, and deals more particularly with a method, system, and computer-readable code for delegating authentication and authority from a client to a server in order that the server can establish a secure connection to a back-end application on behalf of the client.

2. Related Art

As the amount of commerce continues to increase over networks, such as the Internet, security becomes a much larger issue. Unfortunately, the protocols underlying the Internet such as TCP/IP (Transmission Control Protocol/Internet Protocol), were not designed to provide secure data transmission. The Internet was originally designed with the academic and scientific communities in mind, and it was assumed that the users of the network would be working in non-adversarial, cooperative manners. As the Internet began to expand into a public network, usage outside these communities was relatively limited, with most of the new users located in large corporations. These corporations had the computing facilities to protect their user's data with various security procedures, such as firewalls, that did not require security to be built into the Internet itself. In the past several years, however, Internet usage has skyrocketed. Millions of people now use the Internet and the Web on a regular basis. (Hereinafter, the terms "Internet" and "Web" are used synonymously unless otherwise indicated.) These users perform a wide variety of tasks, from exchanging electronic mail messages to searching for information to performing business transactions. These users may be accessing the Internet from home, from their cellular phone, or from a number of other environments where security procedures are not commonly available.

To support the growth of business on the Internet, often referred to as "electronic commerce" or simply "e-commerce," easily-accessible and inexpensive security procedures had to be developed. A first commonly used security measure involves a Public Key Infrastructure (hereinafter "PKI"). PKI utilizes certificates as a basis for a security infrastructure. Certificates utilize public keys and third party verification entities to allow servers to decode client transmissions and authenticate the clients identity. In operation, a first node in a network can encrypt a message with their own private key. The message can be read by a second node with the first node's public key. A public key can only be used to decrypt messages created by the private key and cannot be used to encrypt messages. Thus, the first node is free to distribute their public key. One way in which public keys are distributed is by including them in certificates. There are a number of standards for certificates including the X0.509 standard, which defines a standard format for certificates. X0.509 is an ITU Recommendation and International Standard that defines a framework for providing authentication. (See "ITU Recommendation X0.509 (1997) Information Technology—Open Systems Interconnection—The Directory: Authentication Framework", hereinafter "Directory specification", dated 11/93. This information is also published in International Standard ISDO/IEC 9594-8 (1995).) A certificate format is defined in this standard. Certificates created according to this international standard, in the defined format, are referred to as "X0.509 certificates".

In addition, Secure Sockets Layer, or "SSL" is also utilized to set up encrypted communication links and make use of certificates. SSL is commonly used with applications that send and receive data using the HyperText Transfer Protocol ("HTTP"). HTTP is the protocol most commonly used for accessing that portion of the Internet referred to as the Web. When HTTP is used with SSL to provide secure communications, the combination is referred to as "HTTPS." Non-commercial Internet traffic can also benefit from the security SSL provides. SSL has been proposed for use with data transfer protocols other than HTTP, such as Simple Mail Transfer Protocol ("SMTP") and Network News Transfer Protocol ("NNTP").

SSL is a networking protocol developed by Netscape Communications Corp. and RSA Data Security, Inc. to enable secure network communications in a non-secure environment, where it operates as a protocol layer above the TCP/IP layers. The application code then resides above SSL in the networking protocol stack. After an application (such as a browser) creates data to be sent to a peer in the network, the data is passed to the SSL layer where various security procedures are performed on it, and the SSL layer then passes the transformed data on to the TCP layer. On the receiver's side of the connection, after the TCP layer receives incoming data, the data is passed upward to the SSL layer where procedures are performed to restore the data to its original form, and that restored data is then passed to the receiving application. The most recent version of SSL is described in detail in "the SSL Protocol, Version 3.0," dated Nov. 18, 1996 and available on the World Wide Web ("Web") at http://home.netscape.com/eng/ss 13/draft302.txt (hereinafter, "SSL specification").

These security features are very powerful, and provide a high degree of protection for Internet users. However, both PKI and SSL were designed as two-party protocols, to be used in a simple client/server environment. The SSL protocol allows a client to request a secure communication session by sending a message to a server application. The server then responds, and a sequence of messages are exchanged in a handshaking protocol where the various security-related parameters are negotiated. The encryption algorithms to be used for message privacy and data integrity are agreed upon, and both the client and server may authenticate each other's identity. Authentication is performed during the handshake by exchanging digital certificates. The server sends its certificate to the client, enabling the client to authenticate the server's identity. The server then requests the client's certificate, which the client sends in order that the server can also authenticate the client's identify. If the authentication results are acceptable, the parties complete the handshake, and begin to exchange encrypted application data over the secure session they have established.

While the aforementioned security measures have proved to be useful for a two-party protocol, the traditional client-server model for network computing is being extended in the web environment to what is referred to as a "multi-tier architecture." This architecture may be characterized as a chain of nodes (e.g., a client and multiple servers) wherein a middle-tier or intermediate server may need to contact an end-tier server on behalf of the client. In such a case, the middle-tier server is said to be acting as a delegate of the client, and the process is generally referred to as delegation. In general, there is no limitation on the number of nodes involved in a delegation process. Thus, a first-tier server in contact with a client may be required to act as a delegate of the client by contacting a second-tier server on the client's behalf, and the second-tier server may be required to contact a third-tier server on behalf of either/both the second-tier server or the client.

This multi-tiered architecture recognizes the fact that many client requests do not simply require the location and return of static data by the first server, but require an application program to perform processing of the client's request in order to dynamically create and format the data to be returned. For example, during a commercial transaction between a client and a first server, the first server may need to contact a second server to collect financial information or perform a financial transaction on behalf of the client. In turn, the second server may need to collect a credit history on behalf of the client from a third server, etc. During each such new request in such a chain, it is often imperative that the server fulfilling the request be able to verify that the action is being done with the permission of the client, and/or a previous server in the chain. For example, before a second server (e.g., a bank) debits a client's account based upon a request from a first server (e.g., a commercial web site), the bank must be certain that the client gave permission to do this. Thus, the second server must have some reliable mechanism for verifying a delegated action.

Unfortunately, security protocols, such as those provided by SSL, are strictly two-party protocols, i.e., their use is limited to establishing a secure session between the client and a first or middle-tier server. Accordingly, there are no current methods for extending these secure sessions into a multi-tiered environment. The client authentication process within SSL is designed such that the client digitally signs data that it derives from the middle-tier server's certificate during the handshaking protocol. This digital signature requires the client to use its private key for encryption, and to send the resulting signature back to the middle-tier server along with the client's certificate. The client's private key must never leave the client machine, or it would no longer meet the requirements for a private key. Thus, the middle-tier server cannot create a digital signature on behalf of the client, because the middle-tier server cannot learn the client's private key.

U.S. Pat. No. 5,224,163, entitled METHOD FOR DELEGATING AUTHORIZATION FROM ONE ENTITY TO ANOTHER THROUGH THE USE OF SESSION ENCRYPTION KEYS, issued to Gasser et al. on Jun. 29, 1993, which describes many of the protocols described herein, utilizes a set of point to point certificates sent in sequences. However, the '163 patent does not provide a single signed data structure that can be examined by each server in a chain of servers for delegation purposes. Accordingly, a need exists for a technique for providing security in a multi-tier network environment such that the client's identity can be certified by any server fulfilling requests for the client. Each of the above references is hereby incorporated by reference.

SUMMARY OF THE INVENTION

The present invention overcomes the above-mentioned problems by providing a network system that includes a verification system, the network system comprising: a plurality of sequential nodes 1 . . . M, wherein each node n within the plurality of sequential nodes includes a system for securely communicating with an nth+1 node on behalf of any earlier node; a verification program stored on a computer readable medium, and executable by the nth+1 node to verify any of the earlier nodes by examining a certification data structure (CDS) built by the nth−1 node, wherein the verification program comprises: a mechanism for opening the certification data structure created by the nth−1 node, a mechanism for extracting a public key of the nth−1 node from the certification data structure, and a mechanism for verifying a signature of the certification data structure.

The certification data structure created by an nth−1 node may comprise: a first field containing a certificate of the nth−1 node; a second field containing a certificate of the nth node; a third field containing an expiration time stamp; a fourth field containing a maximum node depth; a fifth field containing the certificate data structure created by the nth−2 node, and a sixth field containing a digital signature of the first, second, third, fourth, and fifth fields encrypted by a private key of the nth−1 node.

Thus, each certification data structure comprises a nested set of previous certification data structures. In this manner, a single data structure format can be utilized by any server for delegation purposes. Accordingly, the verification program need only open a single data structure to verify each previous node in a chain delegating nodes. (Note that the certification data structure created by the first node need not include the fifth field, since there exist no prior nodes.)

BRIEF DESCRIPTION OF THE DRAWINGS

The present invention is illustrated by way of example in the accompanying drawings in which like references indicate like elements and in which.

DESCRIPTION OF THE PREFERRED EMBODIMENT

Figure 1:
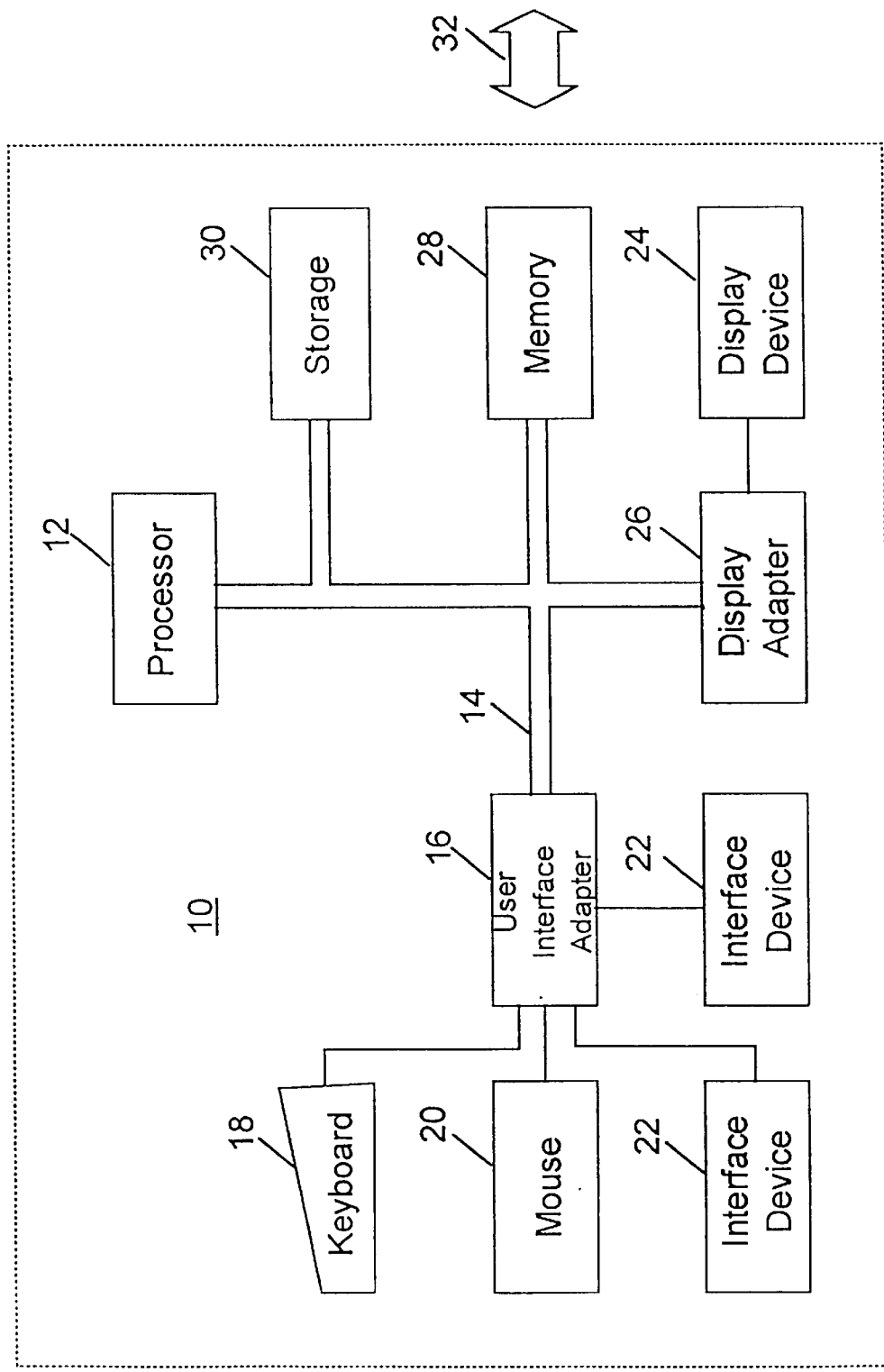
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
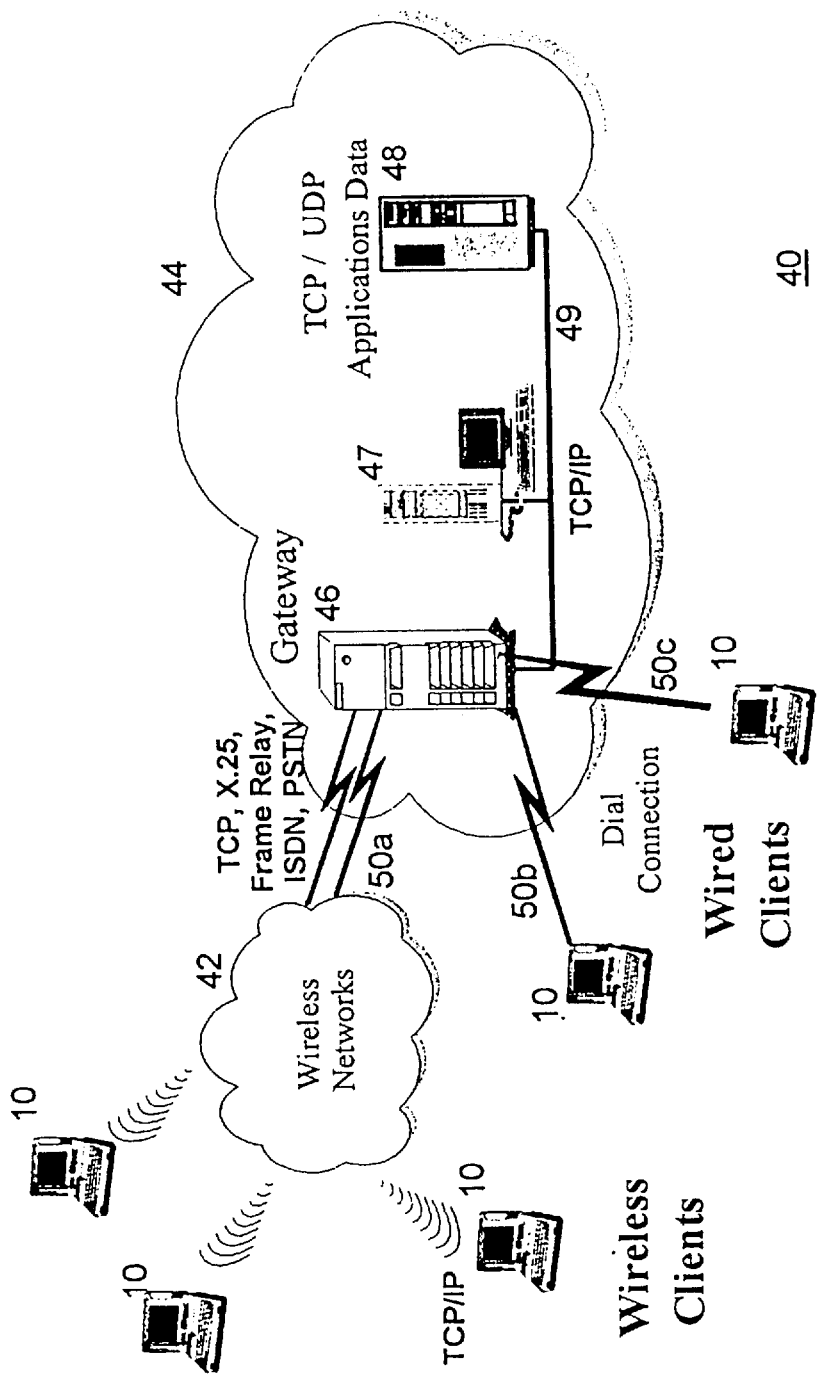
FIG. 2 is a diagram of a network computer environment in accordance with a preferred embodiment of the present invention.

FIG. 2 illustrates a data processing network 40 in which the present invention may be practiced. The data processing network 40 may include a plurality of individual networks, such as a wireless network 42 and network 44, each of which may include a plurality of individual workstations 10. Additionally, as those skilled on the art will appreciate, one or more LAN's may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may be implemented utilizing an Enterprise Systems Architecture/370 available from IBM, an Enterprise Systems Architecture/390 computer, etc. Depending on the application, a midrange computer, such as an Application System/400 (also known as an AS/400) May be employed. ("Enterprise Systems Architecture/370" is a trademark of IBM; "Enterprise Systems Architecture/390," "Application System/400," and "AS/400," are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations '10 may be located a substantial distance from the networks 42 and 44. For example, the network 42 may be located in California, while the gateway 46 may be located in Texas, and one or more of the workstations 10 may be located in New York. The workstations 10 may connection to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X0.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code and related data structures (hereinafter "software") that embody the present invention may be accessed by the microprocessor 12 of the workstation 10, server 47, or other servers and devices from long-term storage media 30 of some type, such as a CD-ROM drive or hard drive, as well as other memory systems (e.g., RAM, ROM, etc.). The software may be embodied on any of a variety of known media for use with a data processing system, such as a diskette, hard drive, or CD-ROM. The software may be distributed on such media, or may be distributed to users from the memory or storage of one computer system over a network of some type to other computer systems for use by users of such other systems. In such cases, a carrier wave (e.g., electromagnetic, optical, etc.) embodying the code and/or data structures may be utilized. Alternatively, the software may be embodied in the memory 28, and accessed by the microprocessor 12 using the bus 14. All techniques and methods for embodying software in memory, on physical media, and/or distributing software code via networks are well known and are all within the scope of this invention.

A user of the present invention at a client computer may connect his computer to a server using a wireline connection, or a wireless connection. Wireline connections are those that use physical media much as cables and telephones lines, whereas wireless connections use media such as satellite links, radio frequency waves, and infrared waves. Any connection technique can be used with these various media, such as: using the computer's modem to establish a connection over a telephone line; using LAN card such as Token Ring or Ethernet; using a cellular modem to establish a wireless connection; etc. The user's computer may be any type of computer processor, including laptop, handheld or mobile computers; vehicle-mounted device; desktop computers; mainframe computers; embedded computers, etc. having processing (and optionally communication) capabilities. The remote server, similarly, can be one of any number of different types of computer which have processing and communication capabilities. These techniques are well known in the art, and the hardware devices and software which enable their use are readily available. Hereinafter, a user's computer will be referred to equivalently as a "workstation," "device," or "computer," and use of any of these terms or the term "server" refers to any type of computing device. All clients and servers are generally referred to as "nodes" within the network. Moreover, a node may act as both a client and a server, depending upon the particular application.

In the various alternative preferred embodiments, the present invention is implemented as one or more computer software programs. The software may be implemented as one or more modules (also referred to as code subroutines, or "objects" in object-oriented programming) which are invoked upon request. The location of the software (whether on the client workstation or on a particular server) may differ for the various alternative embodiment. The logic implementing the delegation may be integrated with the code of a security protocol, such as SSL, or it may be implemented as one or more separate utility modules, which provide services that are invoked by such a program. Any of the servers described herein may be functioning as Web servers, where the Web servers provide services in response to requests from a client connected through the Internet, or from another server. In addition, the present invention may be implemented as an intranet or extranet, or in any other network environment.

Figure 3:
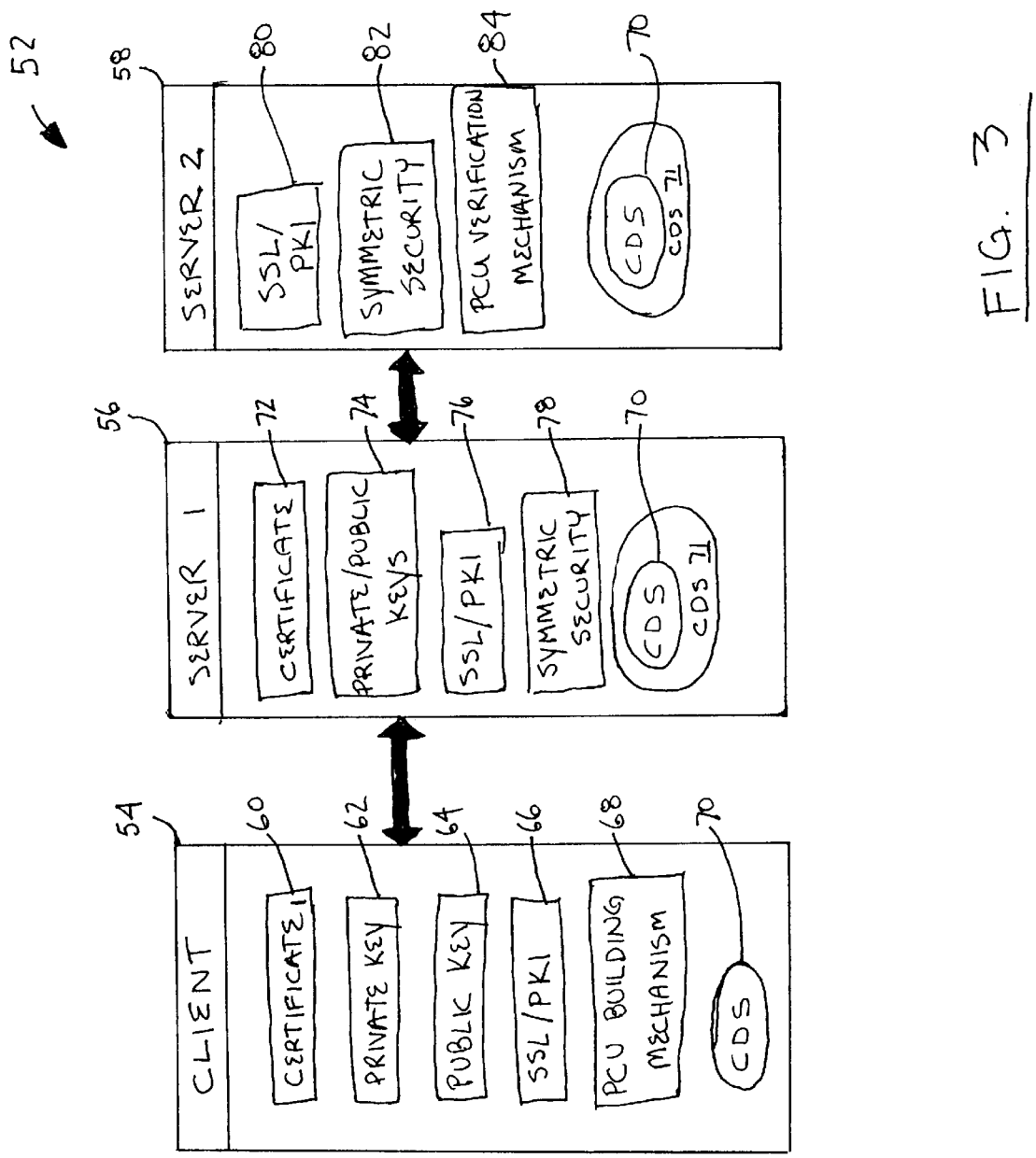
FIG. 3 depicts a three tier network environment in accordance with a preferred embodiment of the present invention.

Referring now to FIG. 3, a network system 52 is depicted that comprises three tiers or nodes. The exemplary system 52 comprises a client 54, a first server 56, and a second server 58. In this example, server 56 is an intermediate server that is in direct communication with client 54, and can act on behalf of the client by interacting with server 58. In this example, each node, i.e., client 54, server 56, and server 58, is shown to contain the necessary components to provide secure delegation in accordance with this invention. While the discussions contained herein with respect to FIG. 3 contemplate a three-tier network, it is understood that the number of tiers is not limited, and the concepts can be readily expanded to an n tier system. Nonetheless, for purposes of this example, only three tiers will be considered.

Client 54 comprises a certificate 60, a private key 62, and a public key 64. Client 54 also includes SSL/PKI capabilities 66 for providing two-tier security with server 56. Furthermore, client 54 comprises a CDS (Certificate Data Structure) building mechanism 68. The CDS building mechanism 68 creates a CDS 70, which can be passed along to the other nodes to allow for verification. In particular, CDS 70 comprises a certification data structure built by client 54, which is then passed to middle-tier node, (i.e., server 56), and is then passed to the end-tier node (i.e., server 58) so that the end-tier node can verify client 54.

Specifically, CDS 70 is a set of information, digitally signed by client 54 with the client's private key 62, that allows server 56 to act as a delegate of client 54. Since the information is signed by the client 54 with the client's private key 62, the information in the CDS 70 cannot be tampered with by any intermediate servers. The information in the CDS 70 need not be private, so that the information need not be encrypted. The contents of the CDS 70 will generally comprise the client's certificate 60, server 56's certificate 72, an expiration time stamp, a maximum allowed depth of use, and a digital signature of the above items, using the client's private key 62. The expiration time stamp is a time set by the client for which server 56 can act as a delegate of the client 54. The maximum allowed depth of use is a number set by the client 54 to limit the number of servers or nodes that are allowed in a chain of delegation. For example, client 54 can decide if server 58 is allowed to contact a fourth tier server (not shown) on behalf of the client 54. The structure of CDS 70 will be described in more detail with regard to FIG. 5.

When client 54 wants server 56 to act as its delegate, it passes CDS 70 to server 56. Once server 56 has CDS 70, it can now act as a delegate on behalf of client 54. For example, should server 56 need to contact server 58 on behalf of client 54, server 56 would build CDS 71 and transfer CDS 71 to server 58. Server 58 could then use the CDS verification mechanism 84 to verify that server 56 has permission to act as a delegate of client 54. Essentially, the CDS verification mechanism 84 extracts the public key 74 of the server 56 from the CDS 71, and then decrypts the digital signature and verifies the signature (e.g., verifies a check sum) of the CDS 71 to ensure that the CDS 71 was not tampered with. If CDS 71 is verified, server 58 knows that server 56 sent the CDS. Server 58 then extracts the public key 64 of the client 54 from CDS 70, decrypts and verifies its digital signature. If the CDS 70 is verified, server 58 knows that the client 54 has indeed given permission to server 56 to act on the client's behalf.

In addition, the CDS verification mechanism 84 can check the expiration time stamp and maximum depth set by the client 54. If the time has expired, or the maximum depth has been exceeded, the end-tier server will know not to fulfill the request of the middle-tier server. The CDS verification mechanism 84 will be described in more detail with respect to the flow chart shown in FIG. 6 and the pseudo source code provided below.

Additionally, it can be seen that servers 56 and 58 may need to communicate many times on multiple clients' behalf. As a performance improvement, servers 56 and 58 can mutually agree on a shared secret symmetric encryption key, which could then be used for signing CDS 71. This performance improvement is described in more detail below with respect to FIG. 4. (An example of a symmetric security protocol includes Data Encryption Standard (DES), FIPS PUB 46, National Bureau of Standards, Jan. 5, 1977, which utilizes a single key to both encrypt and decrypt data.)

Figure 4:
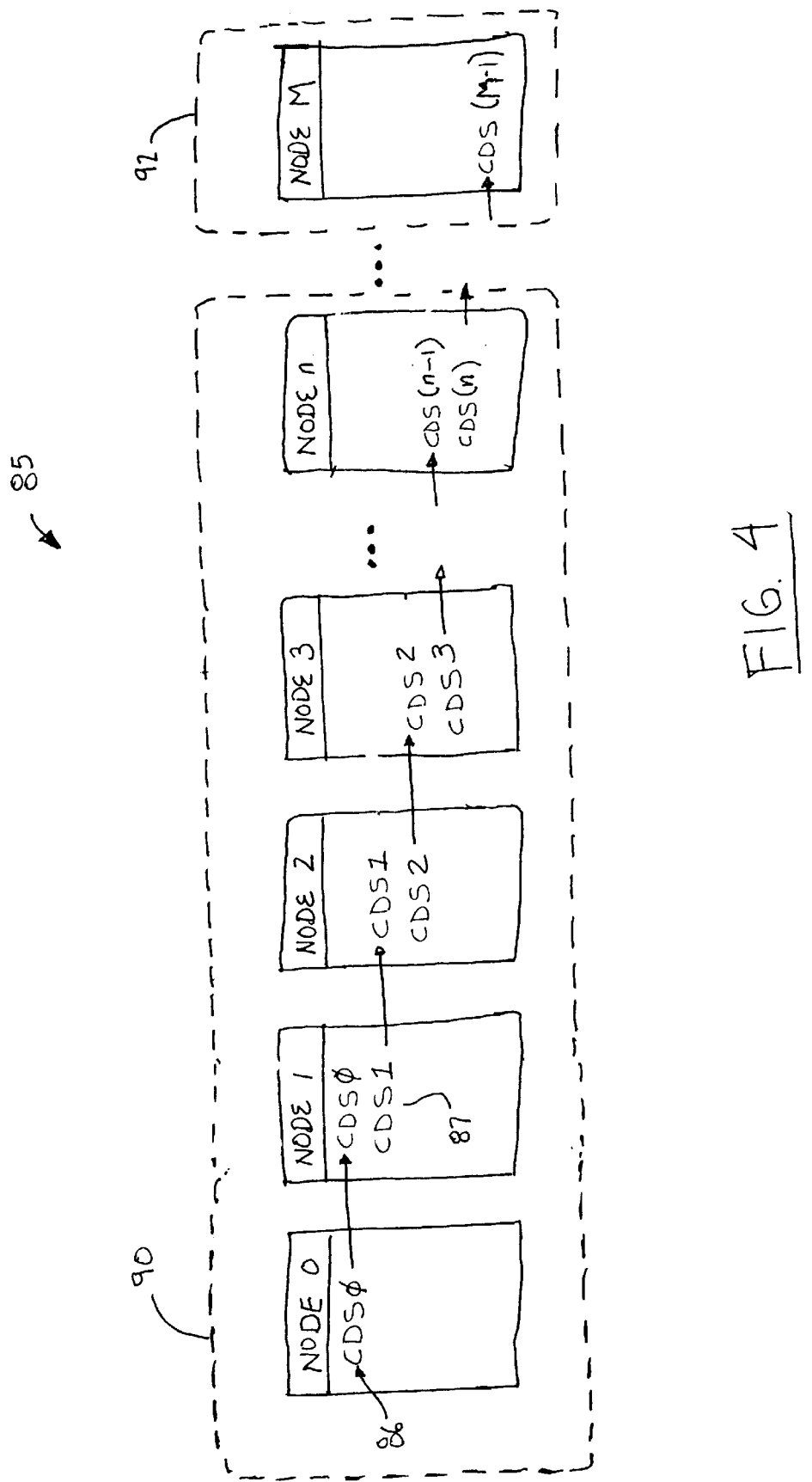
FIG. 4 depicts a multi-tier network architecture in accordance with a preferred embodiment of the present invention.

Referring now to FIG. 4, a more generalized network 85 comprised of a chain of M+1 nodes is depicted. Specifically, network 85 comprises a plurality of nodes, node 0, node 1, . . . node M. While, in this example, node 0 is generally characterized as the original client, node 1 as the first server, node 2 as the second server, etc., any of the nodes can act as either or both client and server nodes. In this example, node 1 is to act on behalf of node 0 by communicating with node 2, node 2 is to act as a delegate of nodes 0 and I by communicating with node 3, node 3 is to act as a delegate of nodes 0, 1 and 2 by communicating with node 4 , etc., up to node M.

To accomplish this, node 0 would first build CDS 0 and give CDS 0 to node 1. Node 1 would then build and transmit CDS 1 (which contains CDS 0) to node 2 so that node 2 could verify node 1 as an authentic delegate of node 0. Then, if node 2 needed to contact node 3 on behalf of node 1 acting as a delegate of node 0, node 2 would build CDS 2 and deliver it to node 3. Node 2 would transfer CDS 2 to node 3 so that node 3 could perform the proper authentication of CDS 2 acting as a delegate of node1, which is acting as a delegate of node 0. This would then continue such that each node requiring a delegate node would build a CDS for the delegate node to verify. Each new CDS (e.g., CDS n) is built in a nested manner to include the prior CDS (e.g., CDS n−1), which in turn includes the prior CDS (e.g., CDS n−2), etc. Thus, each node in the chain can verify each previous node, as well as the original node, node 0.

In addition, as described above, a performance optimization comprising a mixed digital signature method may be utilized. Specifically, nodes 0–(M−1) may use public/private keys 90 (e.g., SSL) for signing CDS 0, while nodes (M−1) –M may utilize a mutually agreed upon secret symmetric signing key 92 (e.g., DES). This optimization reduces the security overhead, while maintaining a necessary level of security. Specifically, node M can verify that node M−1 sent CDS(M−1) since the signature would match only if the correct, secret, signing key was used. The optimization may be exploited in the following two ways.

First, if a server P knows that the CDS will go no further than the next server P+1 (based on a maximum depth setting by either the client, server P or intermediate server), then the server P can use a previously agreed to symmetric signing key when sending the CDS it is building to the next server P+1. Previously agreed to symmetric signing keys can be established only between "adjacent" servers that communicate directly with each other. Accordingly, server P+1, using the previously agreed to symmetric signing key, can verify that the CDS came from server P and was not tampered with since the only key that could have allowed the signature verification was the agreed to by servers P and P+1.

The second case involves the situation where, for example, the maximum depth set by the client is unbounded, i.e., any depth is supported. Then, if the identity of all servers 1–P in a chain of servers are unimportant to the application, previously agreed to symmetric signing keys can be used to sign the CDS's as they are built by each server. The symmetric signing keys are set up between pairs of adjacent servers (i.e., server 1 & server 2, . . . , server n−1 & server n, server n & server n+1 . . . ). When these keys are used, each new server in the chain cannot be guaranteed of the identities of the previous intermediate servers since there is no way to check signatures (other than "adjacent" servers that utilized previously agreed to signing keys). Any server in the chain, however, can verify the signature of the first CDS that was built by the client (node 0) since the client's private key was used to sign the CDS. Each server can also verify that the expiration time stamp set by the client has not been exceeded.

This second case provides a mechanism for providing an "impersonation" style of delegation that is useful when the identities of the intermediate servers are not required by a new server. In order to implement this, the CDS may include an optional flag that can be set by the client indicating that impersonation is to be used.

Figure 5:
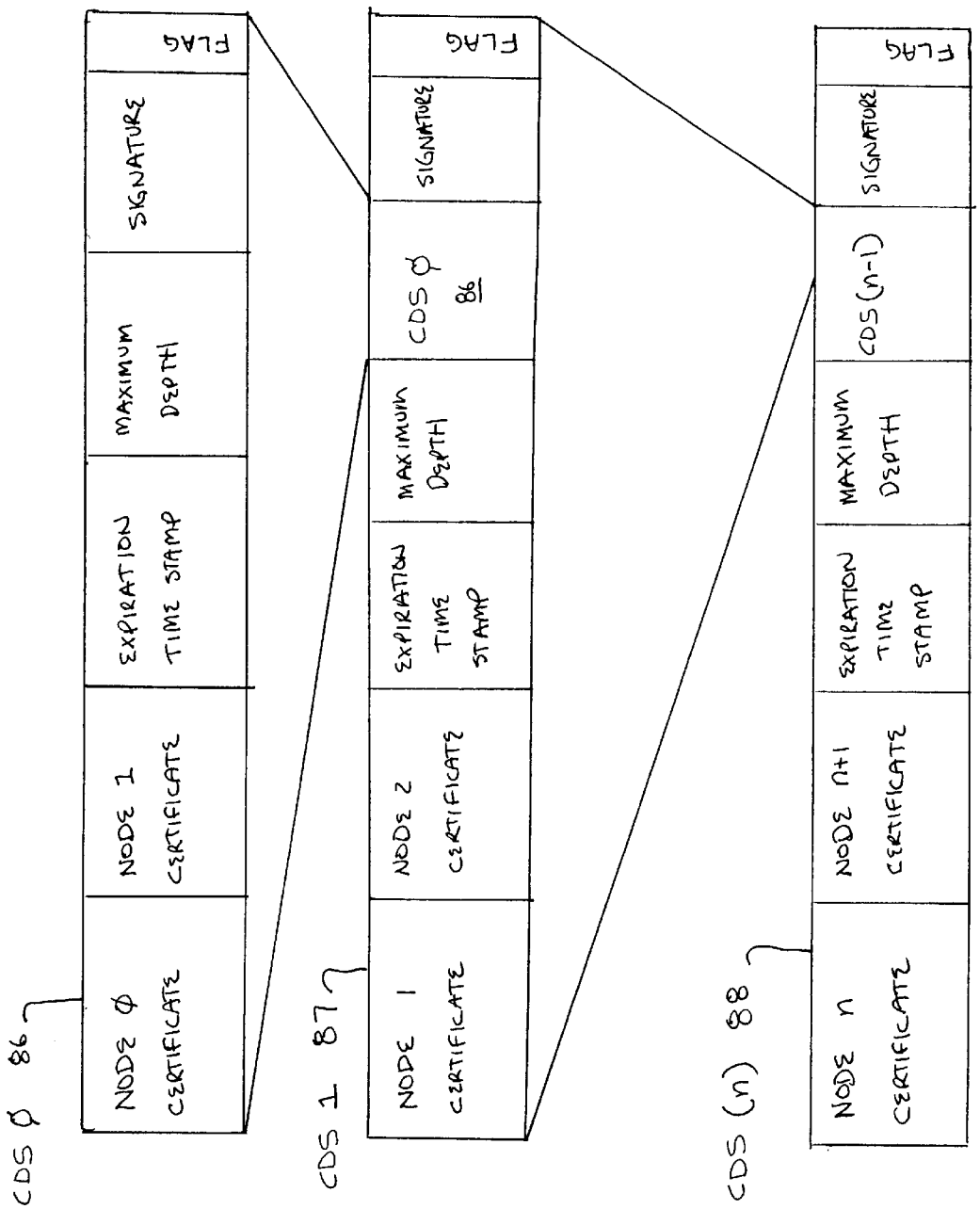
FIG. 5 depicts two potential embodiments of a certification data structure in accordance with a preferred embodiment of the present invention.

FIG. 5 depicts the general format for CDS's. Specifically, there is depicted an original CDS 86, CDS 0 that describes the CDS for the first node in a chain of nodes. CDS 0 86 is a data structure that includes the fields as described above, namely, a certificate of node 0, a certificate of node 1, an expiration time stamp, a maximum depth of use, and a digital signature of the first four fields, encrypted with a private key of node 0. The digital signature may be simply an encrypted check sum of the first four fields.

Next, CDS (n) 88 is depicts a generic data structure for each CDS after CDS 0 86. As with CDS 0 86, CDS (n) 88 comprises a first certificate from node n (i.e., the node that is giving permission to another node to act as its delegate), a second certificate from node n+1 that is acting as the delegate, an expiration time stamp, and a maximum depth of use. In addition, CDS (n) 88 comprises an extra field that includes the CDS from the prior node (i.e. node n−1) in the chain. Each such CDS is built in a recursive manner such that CDS (n) includes CDS (n−1), CDS (n−1) includes CDS(n−2), etc. CDS (n) also include a digital signature encrypted with node n's private key.

The ASN .1 description of the CDS as described above is:

```
PKICertificationOfUse {<OID to be assigned>}
DEFINITIONS::=
BEGIN
-- EXPORTS ALL --
IMPORTS
SIGNED, Certificate
    From AuthenticationFramework {joint-iso-ccitt ds (5)
        module (1) authenticationFramework (7) 2}
```

| -- types -- | |
|---|---|
| CDS ::= SIGNED {SEQUENCE { | |
| CertifcateOfOriginator | Certificate; |
| CertifcateOfServer | Certificate; |
| ExpirationTimeStamp | GeneralizedTime; |
| MaximumDepth | INTEGER; |
| CDSPrevious | CDS OPTIONAL; |
| } } | |
| END | |

While FIG. 5 describes a preferred format for CDS's, it is understood that other arrangements, formats, and fields may be utilized to accomplish the same functionality and are within the scope of this invention. For example, if the performance optimization using mixed digital signature, additional data fields may be included, namely a symmetric signature, symmetric signature key, and a public key signature of the symmetric key.

Figure 6:
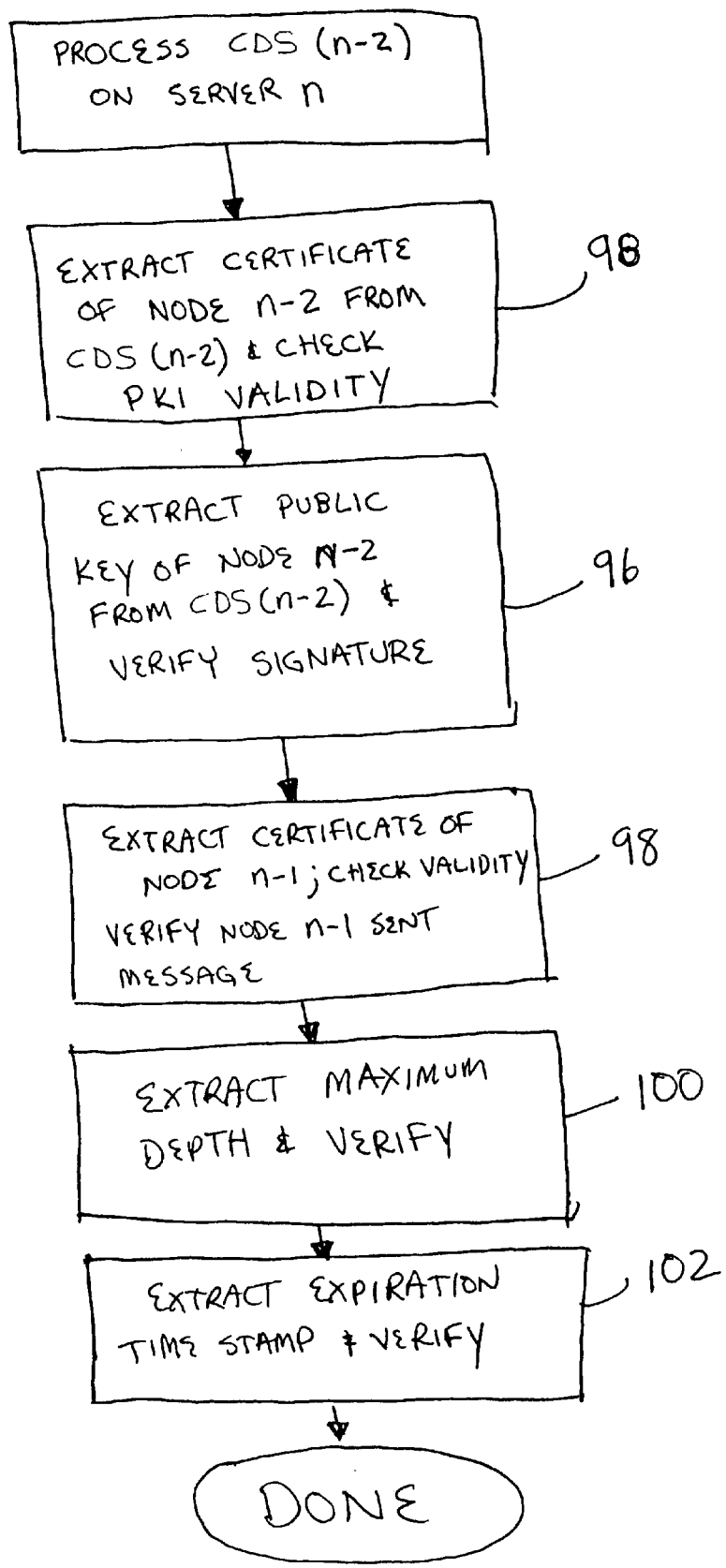
FIG. 6 depicts a flow diagram of a CDS verification mechanism in accordance with a preferred embodiment of the present invention.

Referring now to FIG. 6. A flow diagram of the CDS verification mechanism 84 is depicted for processing CDS n by, for example, node n+2. First node n's certificate is extracted and certified within the PKI infrastructure 94. Next 96, the public key of node n is extracted, and the validity of CDS n is verified by decrypting the digital signature and comparing it to the check sum of CDS n. Subsequently 98, node n+1's certificate is extracted and verified ensuring that CDS(n+1) was sent to its intended recipient. Finally, the maximum allowable depth is extracted and verified 100, and the expiration time stamp is extracted and verified 102. The procedure is then repeated for CDS(n−1) . . . CDS(0) in a recursive manner.

The following algorithm may be used to determine whether the CDS is acceptable (i.e., the maximum depth has not been exceeded for any maximum depth contained in the CDS nor has the expiration time been exceeded for any expiration time stamp contained in the CDS). The result of the algorithm is a flag indicating whether or not the CDS is valid and if so, a list of the nodes contained in the CDS, ordered from $C_0$–$C_N$. The algorithm uses $CDS_{N-(N=1)}$ input so as to simulate execution by node $C_{N+1}$.

```
Procedure ProcessCDS( [in] CDS, [out] validFlag, [out]
ConsumerChainStack, [out] StackDepth)
    Set ConsumerChainStack=NULL
    Set StackDepth=0
    Set CurrentTime=obtain Current time
    Set Rc=Successful
    Call     ParseCDS(CDS,     CurrentTime,
        ConsumerChainStack, StackDepth, Rc)
    If Rc !=Successful then
        ValidFlag=FALSE
        ConsumerChainStack-NULL
    Else
        ValidFlag=TRUE
        First entry in ConsumerChainStack contains the Name
            of the Originator StackDepth indicates how many
            intermediate servers were traversed
    Endif
End Procedure
Procedure ParseCDS([in] CDS, [in] CurrentTime, [in/out]
ConsumerChainStack, [in/out] StackDepth, [out]
ReturnCode)
    Extract certificateOfOriginator and public key certifica-
    teOfOriginator and public key from certificateOfOriginator
    Verify signature of CDS
    If not Verified then
        Set ReturnCode=IncorrectSignature
    Else
        If MaximumDepth<StackDepth+1 then
            Set ReturnCode=depthExceeded
        Else
            Extract Originator Name from certificate OfOrigina-
                tor
            Add Originator Name to top of ConsumerChain-
                Stack
            Increment StackDepth
            If CDSPrevious is Present then
                Call ParseCDS(CDS, ConsumerChainStack,
                    StackDepth, ReturnCode)
                Endif
            Endif
        Endif
    Endif
End Procedure
```

Once the CDS has been validated and parsed, the server processing the CDS can use the resulting information to determine the originator of the request. This information might be used by the server in performing operations on behalf of the original node, or any intermediate nodes that are acting on behalf of the original node.

The foregoing descriptions of the preferred embodiments in the invention have been presented for purposes of illustration and description. They are not intended to be exhaustive or to limit the invention to the precise form disclosed, and obviously many modifications and variations are possible in view of the above teachings. Such modifications and variations that may be apparent to a person skilled in the art are intended to be included within the scope of this invention as defined by the accompanying claims.

What is claimed is:

1. A network system that uses a public key infrastructure for encrypting data, comprised of:
    a client, wherein the client has a public key and a private key;
    a client certificate containing the client's public key;
    a first server that can securely communicate with the client and can securely communicate with a second server on behalf of the client; and
    a verification mechanism that allows the second server to verify the client during communications with the first server by examining a certification data structure, wherein the certification data structure does not include programmatic content, and wherein the certification data structure comprises:
        the client certificate, and
        a digital signature of the certification data structure encrypted by the client's private key.

2. The network system of claim 1, wherein the certification data structure further comprises a certificate of the first server, an expiration time stamp, and a maximum allowed depth of use.

3. The network system of claim 2, wherein the verification mechanism allows the second server to certify the first server by examining the certification data structure.

4. The network system of claim 1, wherein the client comprises a mechanism for building the certification data structure.

5. A method of verifying a client in a multi-tier network system, comprising the steps of:
    initiating communications between the client and a first tier server;
    building a first certification data structure comprised of a certificate of the client and a digital signature of the first certification data structure, wherein the digital signature is encrypted by a private key of the client, and wherein the first certification data structure does not include programmatic content;
    sending the first certification data structure to the first tier server;
    initiating communications between the first tier server and a second tier server on behalf of the client;
    building a second certificate data structure that comprises the first certificate data structure, wherein the second certification data structure does not include programmatic content;
    sending the second certification data structure to the second tier server;
    in the second server, extracting a public key of the first tier server from the second certificate data structure;
    in the second server, decrypting a digital signature of the second certification data structure through use of the public key of the first server and checking the validity of the digital signature of the second certification data structure;
    in the second server, extracting a public key of the client from the first certificate data structure;
    in the second server, verifying the client by decrypting a digital signature of the first certification data structure through use of the public key of the client and checking the validity of the digital signature of the first certification data structure.

6. The method of claim 5, wherein the first certification data structure further comprises a certificate of the second server, an expiration time stamp, and a maximum allowed depth of use.

7. The method of claim 5, wherein the step of sending the first certification data structure to the first tier server is done using asymmetric cryptography.

8. The method of claim 7, wherein the step of sending the first certification data structure to the second tier server is done using symmetric key encryption with a previously agreed to signing key.

9. A computer data signal embodied in a carrier wave, the data signal providing certification data to a second server from a first server regarding a client of the first server, the data signal comprising a certification data structure that does not include programmatic content, wherein the certification data structure comprises:
    security data that includes a public key of both of the first server and client; and
    a digital signature of the security data encrypted with a private key of the first server and the client.

10. The computer data signal of claim 9, wherein the security data further comprises a certificate of the client, a certificate of the first server, an expiration time stamp, and a maximum allowed depth of use.

11. A computer-readable medium having a data structure containing certification data built by an nth node in a computer network, the data structure having the following fields:
    a first data field containing a certificate of a first network node;
    a second data field containing a certificate of a second network node;
    a third data field containing an expiration time stamp;
    a fourth data field containing a maximum node depth;
    a fifth data field containing a nested data structure built by an n−1th node in the computer network; and
    a sixth field containing a digital signature of the first, second, third, fourth, and fifth data fields encrypted by a private key of the first network node,
    wherein the data structure does not include programmatic content.

12. The computer-readable medium of claim 11, wherein the expiration time field and the maximum node depth are set by the first network node.

13. A computer-readable medium containing a program that allows an end node to verify a client of an intermediate node when the intermediate node is in communication with the end node, the program comprising:
    means for opening a certification data structure created by the client, wherein the certification data structure does not include programmatic content;
    means for extracting a public key of the client from the certification data structure; and means for verifying a signature of the certification data structure.

14. The computer-readable medium of claim 13, wherein the program further comprises:
   means for checking an expiration time stamp in the certification data structure; and
   means for checking a maximum node depth.

15. A network system having a certification system, comprising:
   a plurality of sequential nodes 1 ... M, wherein each node n within the plurality of sequential nodes includes a system for securely communicating with an $n^{th}+1$ node on behalf of any earlier node 1 ... (n−1);
   a certification program stored on a computer readable medium, and executable by the $n^{th}+1$ node to verify any of the earlier nodes by examining a certification data structure built by the $n^{th}$ node, wherein the certification data structure built by the $n^{th}$ node does not include programmatic content, and wherein the certification program comprises:
      a mechanism for opening the certification data structure created by the $n^{th}$ node;
      a mechanism for extracting a public key of the $n^{th}$ node from the certification data structure; and
      a mechanism for verifying a signature of the certification data structure.

16. The network system of claim 15, wherein the certification program further includes a mechanism for extracting a certification data structure built by an $n^{th}-1$ node such that the certification data structure built by the $n^{th}-1$ node does not include programmatic content, extracting a public key of the $n^{th}-1$ node, and verifying a signature of the certification data structure built by the $n^{th}-1$ node.

17. The network system of claim 15, wherein the certification program further includes a mechanism for checking an expiration time-stamp created by the $n^{th}-1$ node.

18. The network system of claim 15, wherein the certification program further includes a mechanism for checking a maximum node depth set by the $n^{th}-1$ node.

19. The network system of claim 15, wherein said certification data structure built by the $n^{th}-1$ node comprises:
   a first field containing a certificate of the $n^{th}-1$ node;
   a second field containing a certificate of the $n^{th}$ node;
   a third field containing an expiration time stamp;
   a fourth field containing a maximum node depth; and
   a fifth field containing a digital signature of the first, second, third, and fourth fields encrypted by a private key of the $n^{th}-1$ node.

20. The network system of claim 16, wherein said certification data structure built by the $n^{th}-1$ node comprises:
   a first field containing a certificate of the $n^{th}-1$ node;
   a second field containing a certificate of the $n^{th}$ node;
   a third field containing an expiration time stamp;
   a fourth field containing an maximum node depth;
   a fifth field containing said certification data structure built by the $n^{th}-2$ node; and
   a sixth field containing a digital signature of the first, second, third, fourth and fifth fields encrypted by a private key of the $n^{th}-2$ node.

21. The network system of claim 15, wherein a first node is a client.

22. The network system of claim 16, wherein a second node is server, and wherein the first node communicates with the second node using an asymmetric security encryption system.

23. The network system of claim 22, wherein a third node is a server, and wherein the second and third nodes communicate using a symmetric security encryption system.

24. A network system having a verification system, comprising:
   a plurality of sequential nodes 1 ... M, wherein nodes 1 and 2 can securely communicate using an asymmetric security protocol, and wherein each node 2–M can securely communicate with an adjacent node with using a symmetric security protocol with a previously agreed to signing key;
   a verification program stored on a computer readable medium and executable by a node P to verify node 1 by examining a certification data structure built by the P−1 node, wherein the certification data structure built by the P−1 node does not include programmatic content, and wherein node P resides within nodes 3 ... M, and wherein the certification program comprises:
      a mechanism for extracting a public key of node 1 from the certification data structure; and
      a mechanism for verifying a signature of the certification data structure.

25. The network system of claim 1, further comprising:
   an $n^{th}$ server that can securely communicate with an $n^{th}+1$ server on behalf of the client;
   wherein the verification mechanism allows the $n^{th}+1$ server to verify the client by examining a certification data structure built by an $n^{th}$ server, wherein the certification data structure built by an $n^{th}$ server does not include programmatic content, and wherein said certification data structure built by the $n^{th}$ server comprises:
      an $n^{th}$ server's certificate,
      a certification data structure built by an $n^{th}-1$ server, and
      a digital signature of the $n^{th}$ server's certification data structure encrypted by a private key of the $n^{th}$ server.

* * * * *